United States Patent
Nadahalli et al.

(10) Patent No.: US 10,320,476 B2
(45) Date of Patent: Jun. 11, 2019

(54) TRANSPARENT DEPLOYMENT OF PACKET SERVICES USING OPTICAL TRANSPORT NETWORK

(71) Applicant: Cisco Technology, Inc., San Jose, CA (US)

(72) Inventors: Akshaya Nadahalli, Bangalore (IN); Antonello Bonfanti, Monsummano Terme (IT); Gabriele M. Galimberti, Bovisio Masciago (IT); Manoj Kumar, Bangalore (IN); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/796,548

(22) Filed: Oct. 27, 2017

(65) Prior Publication Data

US 2019/0132045 A1    May 2, 2019

(51) Int. Cl.
*H04B 10/27* (2013.01)
*H04B 10/032* (2013.01)
*H04B 10/075* (2013.01)
*H04L 29/08* (2006.01)

(52) U.S. Cl.
CPC ......... *H04B 10/032* (2013.01); *H04B 10/075* (2013.01); *H04B 10/27* (2013.01); *H04L 69/324* (2013.01)

(58) Field of Classification Search
CPC ........ H04B 10/27; H04B 10/075; H04J 14/02
See application file for complete search history.

(56) References Cited

U.S. PATENT DOCUMENTS

| | | | |
|---|---|---|---|
| 7,710,901 B2 | 5/2010 | Allan et al. | |
| 7,835,267 B2 | 11/2010 | Zamfir et al. | |
| 9,240,905 B2* | 1/2016 | Connolly | H04L 12/6402 |
| 9,559,944 B2 | 1/2017 | Beller et al. | |
| 9,654,418 B2 | 5/2017 | Saltsidis et al. | |
| 2010/0299416 A1* | 11/2010 | Amutham | H04L 63/0876 709/221 |
| 2012/0155872 A1 | 6/2012 | Kakadia et al. | |

(Continued)

OTHER PUBLICATIONS

PCT Notification of Transmittal of the International Search Report and the Written Opionion of the International Searching Authority, or Declaration for Application No. PCT/US2018/057155 datd Jan. 18, 2019.

(Continued)

*Primary Examiner* — Dzung D Tran
(74) *Attorney, Agent, or Firm* — Patterson + Sheridan, LLP

(57) ABSTRACT

A method is disclosed for use by a network element coupled with an optical transport network. The method comprises calculating an optical path from a first packet-terminated optical interface of the network element to a second packet-terminated optical interface of a destination network element coupled with the optical transport network, and signaling the optical transport network to create the optical path. The method further comprises creating an Ethernet interface corresponding to the first packet-terminated optical interface, and adding the Ethernet interface to an Ethernet bundle interface. The method further comprises communicating across the optical path using addressing of the Ethernet bundle interface.

20 Claims, 8 Drawing Sheets

(56) References Cited

U.S. PATENT DOCUMENTS

2015/0131997 A1* 5/2015 Syed ................. H04Q 11/0066
398/69
2017/0295090 A1* 10/2017 Gopalan ................. H04L 45/22

OTHER PUBLICATIONS

Austin Gary p. et al: 11 Fast, scalable, and distributed restoration in general mesh optical networks 11 Bell Labs Technical Journal, Wiley, CA, us.vol. 6, No. I, Jan. 1, 2001 (Jan. 1, 2001) • pp. 67-81,.
Ali Sajassi Samer Salam Sami Boutros Keyur Patel Cisco: "E-VPN Ethernet Segment Route; draft-sajassi-12vpn-EVPN-Segment-Route-OO.Txt", Internet Engineering Task Force, IETF; Tandardworkingdraft, Internet Society (ISOC) 4, Rue Des Falaises CH- 1205 Geneva, Switzerland, Jul. 4, 2011 (Jul. 4, 2011), pp. 1-13,.

* cited by examiner

TRANSPARENT DEPLOYMENT OF PACKET SERVICES USING OPTICAL TRANSPORT NETWORK

TECHNICAL FIELD

Embodiments presented in this disclosure generally relate to high-speed communications systems, and more specifically, techniques for deploying packet services using an optical transport network.

BACKGROUND

In converged transport architectures, Ethernet frames (specifically, layer 2 or L2 Ethernet frames) are transparently transported using a wide range of optical-based transport networks, such as synchronous optical networking (SONET), Optical Transport Network (OTN, or Packet over Optical Channel Data Unit (ODU)), Dense Wavelength Division Multiplexing (DWDM), and so forth.

In many cases, the Ethernet interface identifier is modelled to follow (e.g., incorporates) the interface identifier of the transport layer. For this reason, certain benefits of a converged transport architecture may be unavailable. Some non-limiting examples of these benefits include (1) a portability of user configuration and packet features on a terminated packet interface—which may be dynamically created on any available path in the transport network, (2) support for protection schemes supported by the transport network, (3) the transparent application of packet features to redundant paths in the transport network, and (4) the transparent migration of services in the transport network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
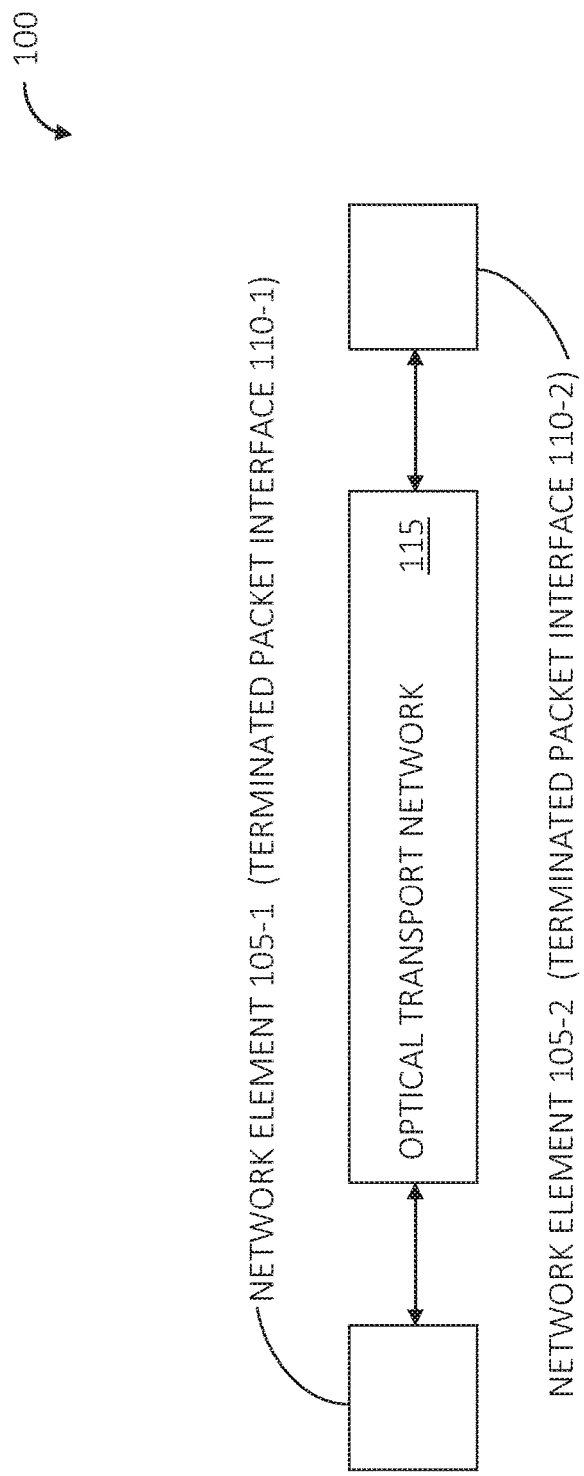
FIG. 1 illustrates an exemplary communication system, according to embodiments described herein.

One embodiment presented in this disclosure is a method for use by a network element coupled with an optical transport network. The method comprises calculating an optical path from a first packet-terminated optical interface of the network element to a second packet-terminated optical interface of a destination network element coupled with the optical transport network, and signaling the optical transport network to create the optical path. The method further comprises creating an Ethernet interface corresponding to the first packet-terminated optical interface, and adding the Ethernet interface to an Ethernet bundle interface. The method further comprises communicating across the optical path using addressing of the Ethernet bundle interface.

Another embodiment presented in this disclosure is a network element suitable for use with an optical transport network. The network element comprises one or more computer processors configured to calculate an optical path from a first packet-terminated optical interface of the network element to a second packet-terminated optical interface of a destination network element coupled with the optical transport network, and signal the optical transport network to create the optical path. The one or more computer processors are further configured to create an Ethernet interface corresponding to the first packet-terminated optical interface, and add the Ethernet interface to an Ethernet bundle interface. The one or more computer processors are further configured to communicate across the optical path using addressing of the Ethernet bundle interface.

Another embodiment presented in this disclosure is a computer program product for use by a network element coupled with an optical transport network. The computer program product comprises a computer-readable storage medium having computer-readable program code embodied therewith. The computer-readable program code is executable by one or more computer processors to perform an operation that includes calculating an optical path from a first packet-terminated optical interface of the network element to a second packet-terminated optical interface of a destination network element coupled with the optical transport network, and signaling the optical transport network to create the optical path. The operation further includes creating an Ethernet interface corresponding to the first packet-terminated optical interface, and adding the Ethernet interface to an Ethernet bundle interface. The operation further comprises communicating across the optical path using addressing of the Ethernet bundle interface.

Example Embodiments

In various embodiments disclosed herein, a network element is configured to transport Ethernet packets over an optical transport network. In some embodiments, the network element may be a multilayer converged transport network element. The network element may be configured to apply link aggregation or link bundling techniques to form a virtual interface between network elements. Beneficially, by communicating using virtual interfaces established between network elements, user configuration information and/or packet features may remain transparent to paths and/or local ports of the optical transport network. In this way, features such as dynamic path computation and instantiation using the control plane (e.g., through via Generalized Multi-Protocol Label Switching (GMPLS)) and/or management plane (e.g., through a Software Defined Networking (SDN) controller) are supported, as well as various protection schemes supported by optical transport layers.

FIG. 1 illustrates an exemplary communication system 100, according to embodiments described herein. As shown, the communication system 100 comprises a first network element 105-1 (generically, a network element 105) having a first terminated packet interface 110-1 (generically, a terminated packet interface 110), which is communicatively coupled via an optical transport network 115 to a second network element 105-2 having a second terminated packet interface 110-2. Each network element 105 generally comprises one or more computer processors that are configured to route and/or process network traffic, as well as a memory (which may include volatile and/or non-volatile memory elements). Each network element 105 may further comprise various input/output (I/O) interfaces coupled with the one or more computer processors, such as electrical and/or optical network interfaces, interfaces for displays or user input devices, and so forth.

In some embodiments, the network element 105 may be a multilayer converged transport network element that is configured to provide both packet switching and optical switching functionalities. The network element 105 may have any suitable implementation, such as a multiple-rack-unit supporting a plurality of line cards. In some cases, each line card provides various functionality to the network element 105, such as packet forwarding, Optical Transport Network (OTN) switching, Dense Wavelength Division Multiplexing (DWDM) transponding, and so forth. The optical transport network 115 generally comprises one or more optical elements (such as optical fibers) that are suitable for establishing one or more optical communication channels between the network elements 105.

In some embodiments, each network element 105 is configured to transport L2 Ethernet packets over the optical transport network 115. One technique for achieving this transport is to model the Ethernet interface identifier to follow the interface identifier of the transport layer. In some cases, "following" the interface identifier may comprise partially or entirely incorporating the transport layer interface identifier.

For example, in Packet over ODU, assume that an OTN interface is assigned an identifier of:

OTU<x><Rack>/<Slot>/<Port>, where OTU<x> indicates a data rate for the interface, and <Rack>, <Slot>, and <Port> each provide location information for the interface within the network element 105. The ODU may then be assigned an identifier of:

ODU<x><Rack>/<Slot>/<Port>/<Oduld>, where ODU<x> indicates a data rate that may be mapped into the OTU<x>. OTU<x> may alternately be referred to as OTUk, where k represents a predefined identifier. Some examples of standardized OTUk data rates include OTU0, OTU1, OTU2, OTU2e, OTU2f, OTU3, OTU3e2, and OTU4. Similarly, ODU<x> may alternately be referred to as ODUk and may have standardized data rates such as ODU0, ODU1, ODU2, ODU2e, ODU3, ODU3e2, and ODU4. The identifier for the ODU interface repeats (or incorporates) the <Rack>, <Slot>, and <Port> information of the OTN interface identifier, and adds the <Oduld> field. Similarly, the Ethernet interface may be assigned an identifier of:

<X>GigE<Rack>/<Slot>/<Port>/<Oduld>/<Interface number>, where <X>GigE indicates a data rate for transmitting Ethernet frames. The identifier for the Ethernet interface repeats most of the ODU interface identifier and adds the <X>GigE and <Interface number> fields.

Maintaining the similarity between interface identifiers may be done for any number of reasons. Some non-limiting examples include ease of management or identification for a user, preserving a physical location associated with the Ethernet interface, supporting Network Management System and/or control plane operations, providing a hardware association of the Ethernet interface with its parent interface in the hierarchy, and so forth. However, this style of hierarchical interface modelling for a packet interface can limit the dynamic capabilities of the control plane that created the interface (e.g., functionality available via Generalized Multi-Protocol Label Switching (GMPLS)), and can also limit the ability of the interface to use protection schemes that are otherwise available through the transport layers.

According to embodiments described herein, the network element 105 is configured to associate a virtual interface (e.g., using link-aggregation or link-bundling techniques) with the associated terminated packet interface 110. In this way, the terminated packet interface 110 may be decoupled from the user interface used by the network element 105. In some embodiments, the terminated packet interface 110 (e.g., L2 Ethernet) may be independently created and/or deleted by the network element 105 using one of the following: a transport layer control plane (e.g., GMPLS), a management plane, a Network Management System, and a Software-Defined Network controller. The network element 105 may use any suitable type of interface identifier modeling for the terminated packet interface 110, and may use any suitable path through the optical transport network 115. The network element 105 may then add and/or remove the terminated packet interface 110 as a member of a virtual (or bundled) interface.

In this way, any user configuration and/or packet features that are enabled on the virtual interface by the network element 105 can remain transparent to any changes in the membership of the virtual interface (e.g., adding or subtracting terminated packet interfaces 110 to support a dynamic bandwidth allocation), as well as to which transport path and/or local ports are used by the members. Using the virtual interface allows the network element 105 to perform dynamic path computation within the control plane (e.g., available through GMPLS), as well as to apply transport layer protection schemes. Additionally, the virtual interface allows members to reside at any suitable location (e.g., a line card, node, rack, chassis) of the network element 105.

Although specific examples are described with OTN as the optical transport network 115 and GMPLS provided via the control plane, the techniques discussed herein are applicable to other suitable optical transport planes and associated control planes. The techniques discussed herein are also suitable for use with configurations having a management plane and/or a SDN controller.

Figure 2:
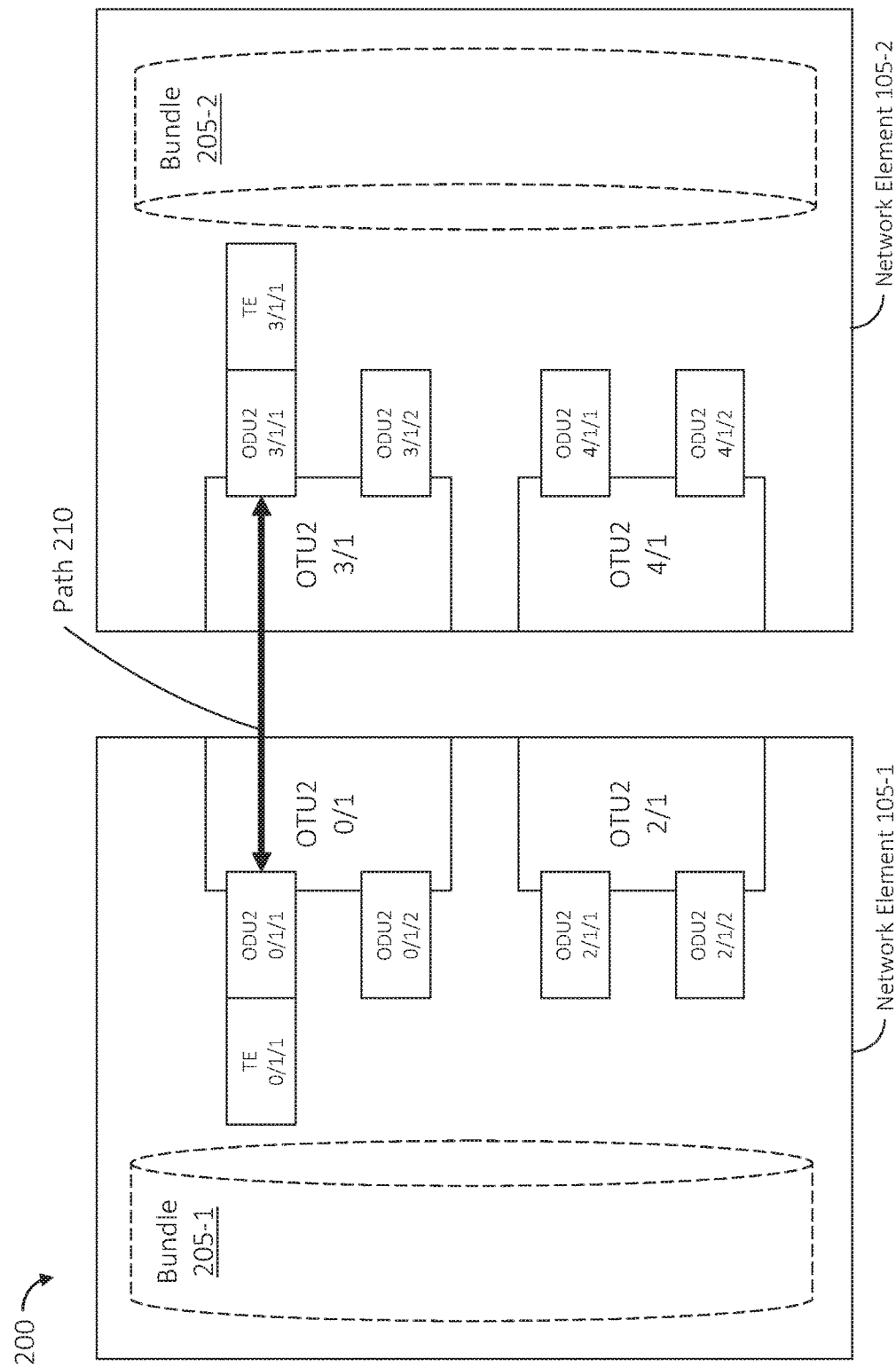
FIG. 2 is a diagram illustrating an exemplary virtual interface established between network elements, according to embodiments described herein.
Figure 3:
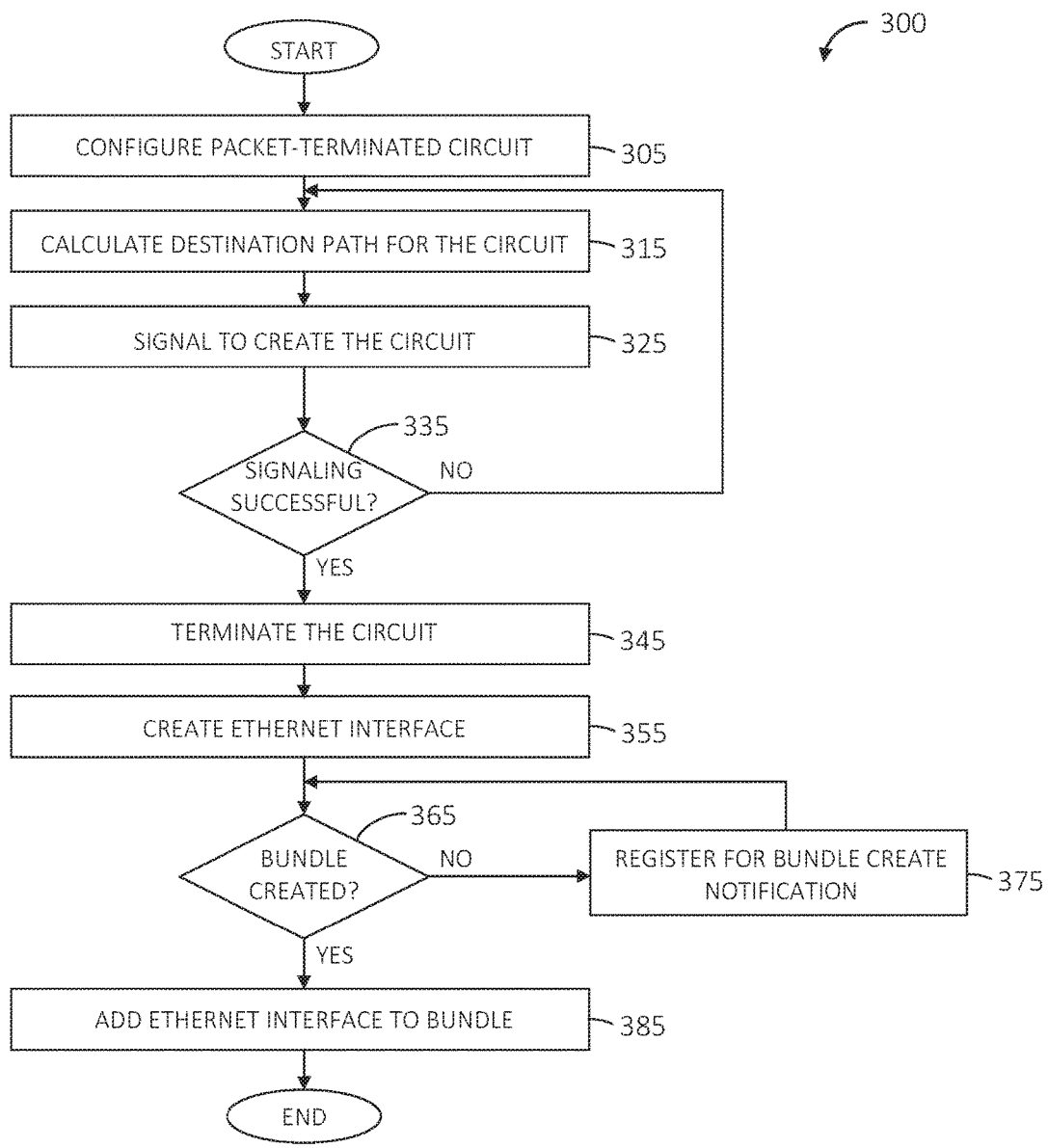
FIG. 3 is an exemplary method for establishing a virtual interface between network elements, according to embodiments described herein.

FIG. 3 is an exemplary method 300 for establishing a virtual interface between network elements, according to embodiments described herein. One example of the virtual interface is depicted in diagram 200 of FIG. 2. The method 300 may be performed in conjunction with other embodiments, such as performed using a network element 105 of FIG. 1.

Referring to FIGS. 2 and 3, method 300 begins at block 305, where the network element configures a packet-terminated circuit using an optical transport network. In diagram 200, the network element 105-1 comprises an OTU2 interface 0/1 associated with two ODU2 interfaces 0/1/1, 0/1/2, and an OTU2 interface 2/1 associated with two ODU2 interfaces 2/1/1, 2/1/2. The network element 105-2 comprises an OTU2 interface 3/1 associated with two ODU interfaces 3/1/1, 3/1/2, and an OTU2 interface 4/1 associated with two ODU interfaces 4/1/1, 4/1/2. Other numbers and/or types of interfaces (e.g., different label-switched path (LSP) encoding types) are also possible for each network element 105. In diagram 200, the network element 105-1 configures a packet-terminated circuit by establishing the ODU2 interface 0/1/1 through the OTU2 interface 0/1.

At block 315, the network element calculates a destination path for the packet-terminated circuit. In diagram 200, the network element 105-1 calculates a destination path to the ODU2 interface 3/1/1 of the network element 105-2 through the OTU2 interface 3/1.

At block 325, the network element transmits signals to the optical transport network to create the packet-terminated circuit. In some embodiments, the network element 105-1 creates a GMPLS packet-terminated ODU circuit (or "tunnel") between the ODU2 interface 0/1/1 and the ODU2 interface 3/1/1.

At block 335, the network element determines whether the signaling was successful to create the packet-terminated circuit. If the signaling was not successful ("NO"), the method 300 returns to block 315 and calculates a different destination path for the packet-terminated circuit. If the signaling was successful ("YES"), path 210 exists between the ODU2 interface 0/1/1 and the ODU2 interface 3/1/1. The method 300 proceeds to block 345, wherein the network element terminates the circuit. At block 355, the network element creates an Ethernet interface. In some embodiments, the Ethernet interface is created by the network element 105-1 as a traffic engineering (TE) link 0/1/1 that incorporates the same location information as the ODU2 interface 0/1/1.

At block 365, the network element 105-1 determines whether an Ethernet bundle 205-1 has been created. If the Ethernet bundle 205-1 has not been created ("NO"), the network element 105-1 registers for bundle create notification at block 375. The method 300 returns to block 365. If the Ethernet bundle 205-1 has been created ("YES"), the method 300 proceeds to block 385, where the network element 105-1 adds the created Ethernet interface (that is, the TE link 0/1/1) to the Ethernet bundle 205-1. Method 300 ends following completion of block 385.

Within the method 300, a respective Ethernet bundle 205-1, 205-2 may be associated with each network element 105-1, 105-2. In this way, the GMPLS operated by the network element 105-1, 105-2 is able to signal the ODU circuit or tunnel (e.g., path 210) using any port in the system. The path 210 may be determined according to any suitable techniques, whether now-known or later-developed. In some embodiments, the path 210 is terminated such that the Ethernet interface has the same location information as the ODU. The GMPLS may then add the created Ethernet interface to an Ethernet bundle 205-1. In this way, the created Ethernet interface is capable of supporting the packet features as applied to the Ethernet bundle 205-1. One example of configuration information for configuring the virtual interface and associated operational state information using, e.g., the network element 105-1, and generally corresponding to the method 300, is provided in Table 1.

TABLE 1

Example configuration information for working path

| | |
|---|---|
| mpls traffic-eng | // enter GMPLS TE config. mode |
|   gmpls optical-nni | // enter GMPLS network-to-network interface (NNI) config. mode |
|     controller odu-Group-Te A | // enter tunnel configuration mode |
|       destination ipv4 unicast B.B.B.B | // specify destination address |
|       signalled-bandwidth ODU2 | // specify signal bandwidth |
|       path-option 1 dynamic protected-by none lockdown | // specify path option |
|       Static-uni local-termination ingress bundle1 egress <snmp-ifindex-of-bundle> | |
|         // specify static user-network interface (UNI) endpoints of the NNI tunnel | |
| Interface bundle-ether 1 | |
|   Ipv4 address A.A.A.A | |
| Show bundle bundle-ether 1 | |
|   Status : Up | |
|   Te0/1/1 | |
| Interface bundle-ether 5 | |
|   Ipv4 address B2.132.62.62 | |
| Show bundle bundle-ether 5 | |
|   Status : Up | |
|   Te3/1/1 | |

Within Table 1, the term "<snmp-ifindex-of-bundle>" is used for identifying the bundle interface at the network element 105-2 from the network element 105-1. By using "<snmp-ifindex-of-bundle>" to identify the bundle interface instead of, for example, information associated with the tail end <X>GigE interface, the transparency of the virtual interface is maintained and the user configuration remains portable.

Establishing the virtual interface (e.g., using the Ethernet bundles 205-1, 205-2) between the network elements 105-1, 105-2, e.g., according to method 300, can offer numerous benefits. First, packet features that have been applied to the virtual interface are portable in the event of dynamic changes to the optical transport network. In the case of Packet over ODU traffic, the dynamic changes may include a GMPLS re-signaling of the optical tunnels or channels. In the case of an SDN controller, the dynamic changes may include a change in the transport circuit.

The created virtual interface carries a similar identification hierarchy and resides in the same location on the network element 105 as the underlying transport layer interface. Thus in the event of a dynamic change to the transport layer (e.g., a change to path 210) due to network failures and/or optimization processes, the new available path could be made available through a different physical entity (e.g., a different line card, rack, chassis, and so forth) within the network element 105. However, if the path 210 is moved to a new entity, the identification of the associated packet interface would also be changed accordingly.

Absent the virtual interface, these changes in the path can cause significant complexities in migrating the path and/or transferring user configuration information or packet features from the old packet interface to the newly-created packet interface. Further, the reapplication of user configuration information would affect packet routing protocols state and data, which is more complex than simply toggling a state of the interface.

Second, using the virtual interface allows protection schemes that are included in the transport network to be supported. For example, OTN includes several protection schemes to ensure service is maintained to the destination network element(s). The protection schemes may be associated with a guaranteed switching time. For example, a "1+1" protection scheme may have a guaranteed switching time of 50 milliseconds (ms), a "1+R" protection scheme may have a guaranteed switching time of 500 ms, and a "1+1+R" protection scheme may have a guaranteed switching time of 50 ms or 500 ms.

The transport layer control plane is able to guarantee that these switching times are met by establishing redundant trunk paths (whether in a different shared risk link group (SRLG), node, link, etc.). The network element 105 then requests the data plane to replicate or switch traffic over each of the redundant trunk paths. When one path fails, data traffic may be carried seamlessly over the other paths. However, the same would not be possible for the terminated packet interface since each terminated interface provides an independent packet interface from a particular location (e.g., Rack/Slot/Port) within the network element 105 and follows the interface modelling identification provided by the trunk port.

Third, the traffic path may be optimized for network upgrades or other changes. When the end service is carried on an interface that follows the transport layer interface modelling, a user moving the service to another transport layer interface would require a considerable amount of reconfiguration, even where the operation is done via a SDN controller. This corresponds to a larger maintenance window for shifting services and is generally contrary to the goal of providing transparency between layers of the network elements 105.

Figure 4:
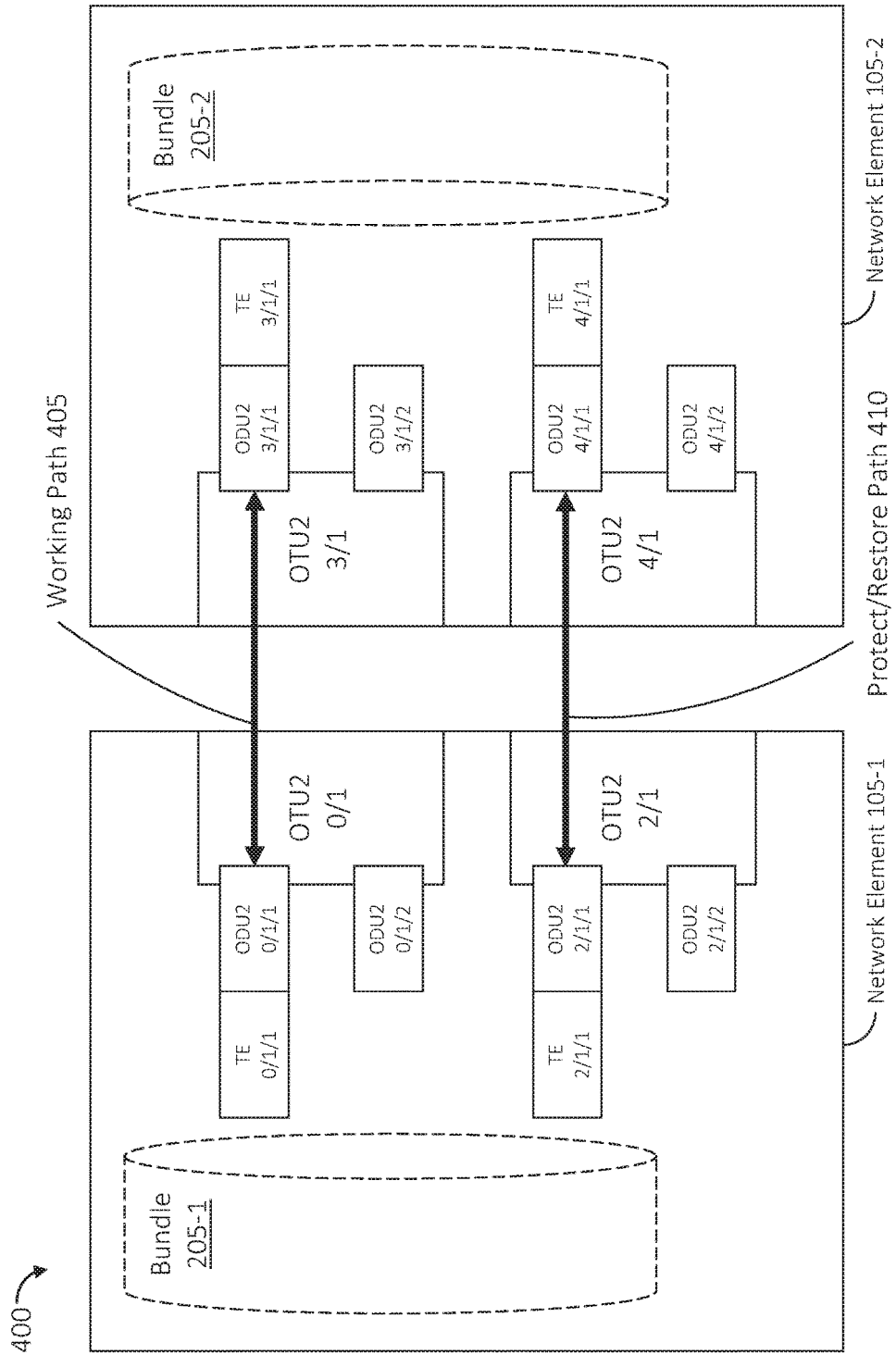
FIG. 4 is a diagram illustrating an exemplary virtual interface including a protect path and/or a restore path, according to embodiments described herein.

FIG. 4 is a diagram 400 illustrating an exemplary virtual interface including a protect path and/or a restore path, according to embodiments described herein. The diagram 400 may be used in conjunction with other embodiments described herein.

In diagram 400, a working path 405 is an ODU2 tunnel established between ODU2 interface 0/1/1 and ODU2 interface 3/1/1. The Ethernet interface associated with ODU2 interface 0/1/1 (i.e., TE 0/1/1) is included in Ethernet bundle 205-1, and the Ethernet interface associated with the ODU interface 3/1/1 (i.e., TE 3/1/1) is included in Ethernet bundle 205-2.

In some embodiments, the network element 105-1 may establish a protect path or a restore path (generically referred to as Protect/Restore Path 410) to provide redundancy within the associated bundle 205-1. As shown in diagram 400, the Protect/Restore Path 410 is an ODU2 tunnel between ODU2 interface 2/1/1 and ODU2 interface 4/1/1.

Figure 5:
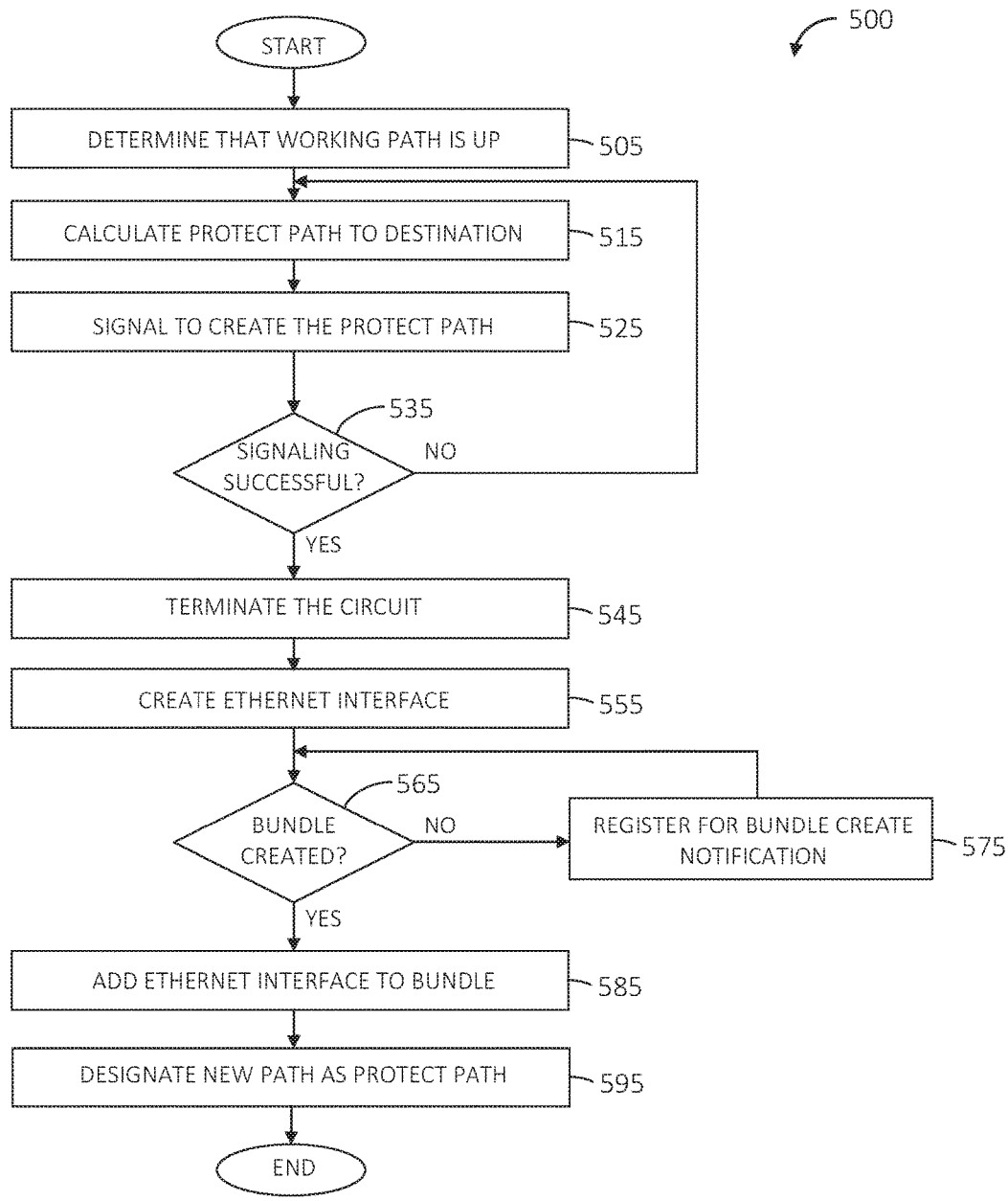
FIG. 5 is an exemplary method for establishing a virtual interface having a protect path, according to embodiments described herein.

FIG. 5 is an exemplary method 500 for establishing a virtual interface having a protect path, according to embodiments described herein. Method 500 may be used in conjunction with other embodiments described herein, such as using method 300 to establish the working path with the network element.

Method 500 begins at block 505, where the network element determines that the working path is up. At block 515, the network element calculates a protect path to the destination. The protect path is distinct from the working path. At block 525, the network element signals the protect path. At block 535, if signaling is not successful ("NO"), the method 500 returns to block 515 and calculates a different protect path. If signaling is successful ("YES"), the method 500 proceeds to block 545 and the network element terminates the circuit. Referring to FIG. 4, the network element 105-1 terminates the ODU2 tunnel at ODU2 interface 4/1/1 of network element 105-2. At block 555, the network element creates the Ethernet interface. In some embodiments, the Ethernet interface created by the network element incorporates the same location information as the associated ODU2 interface.

At block 565, the network element determines whether an Ethernet bundle has been created. If the Ethernet bundle has not been created ("NO"), the network element registers for bundle create notification at block 575. The method 500 returns to block 565. If the Ethernet bundle has been created ("YES"), the method 500 proceeds to block 585, where the network element adds the created Ethernet interface to the Ethernet bundle. Referring to FIG. 4, the network element 105-1 adds the created Ethernet interface (TE link 2/1/1) to the Ethernet bundle 205-1. At block 595, the network element designates the newly-created path as the protect path. Method 500 ends following completion of block 595.

Adding the protect path to the virtual interface provides a "1+1" protection scheme, such traffic would continue to flow through the virtual interface should a failure of either the working path or the protect path occur. Additionally, after the second Ethernet interface corresponding to the protect path is added to the Ethernet bundle, the Ethernet bundle will have twice the capacity. One example of configuration information for the virtual interface and associated operational state information, and generally corresponding to the method 500, is provided in Table 2.

TABLE 2

| Example configuration information for protect path |
|---|
| mpls traffic-eng |
|    gmpls optical- nni |
|      controller odu-Group-Te A |
|        destination ipv4 unicast B.B.B.B |
|        signalled-bandwidth ODU2 |
|        path-option 1 dynamic protected-by 2 lockdown |
|        Path-option 2 dynamic lockdown |
|        Static-uni local-termination ingress bundle1 egress bundle 5 |
| Interface bundle-ether 1 |
|    Ipv4 address A.A.A.A |
| Show bundle bundle-ether 1 |
|    Status : Up |
|    Te0/1/1 : Inactive |
|    Te2/1/1 : Active |
| Show interface Te0/1/1 |
|    Status : Down |
| Show interface Te2/1/1 |
|    Status : Up |
| Interface bundle-ether 5 |

TABLE 2-continued

Example configuration information for protect path

Figure 6:
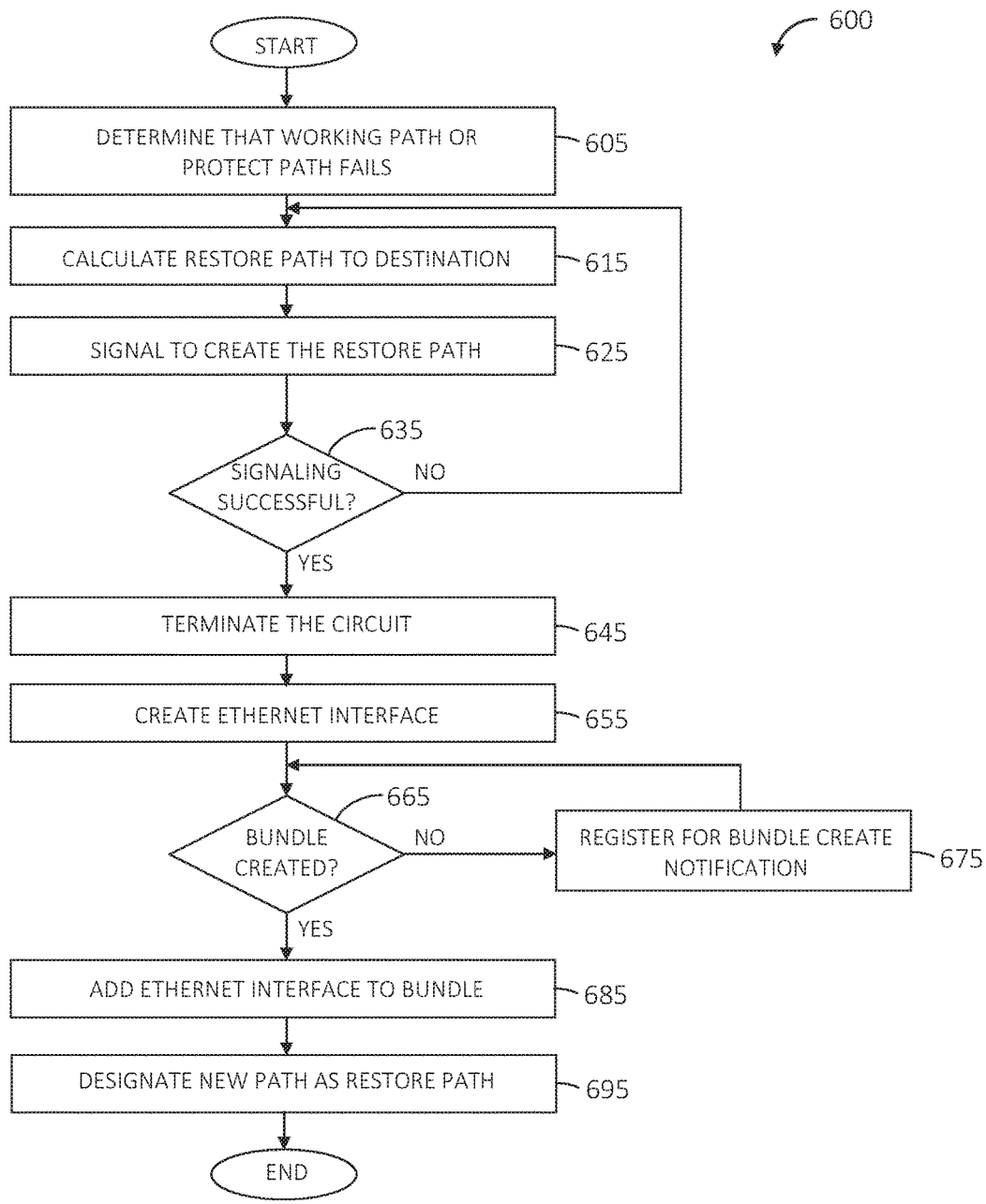
FIG. 6 is an exemplary method for establishing a virtual interface having a restore path, according to embodiments described herein.

Ipv4 address B2.132.132.132
Show bundle bundle-ether 5
  Status : Up
  Te3/1/1 : Inactive
  Te4/1/1 : Active
Show interface Te3/1/1
  Status : Down
Show interface Te4/1/1
  Status : Up FIG. 6 is an exemplary method 600 for establishing a virtual interface having a restore path, according to embodiments described herein. Method 600 may be used in conjunction with other embodiments described herein, such as using method 300 to establish the working path and/or using method 500 to establish the protect path.

Figure 7:
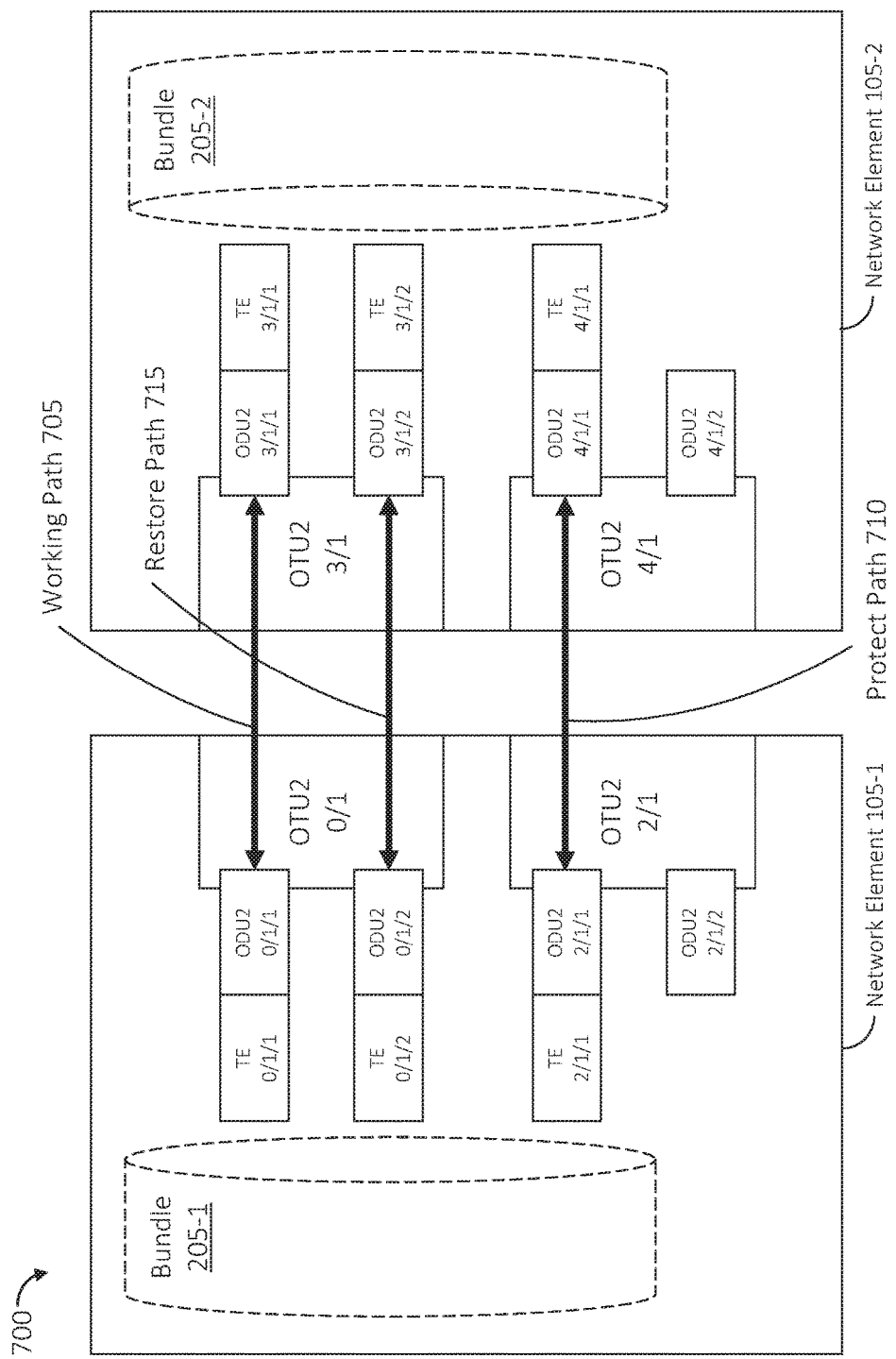
FIG. 7 is a diagram illustrating an exemplary virtual interface including a protect path and a restore path, according to some embodiments described herein.

Referring to FIGS. 6 and 7, the method 600 begins at block 605, where the network element determines that the working path 705 or the protect path 710 fails. At block 615, the network element calculates a restore path 715 to the destination. The restore path 715 is distinct from the working path 705 and the protect path 710. At block 625, the network element signals to create the restore path 715. At block 635, if signaling is not successful ("NO"), the method 600 returns to block 615 and calculates a different restore path 715. If signaling is successful ("YES"), the method 600 proceeds to block 645 and the network element terminates the circuit. In diagram 700 of FIG. 7, restore path 715 includes an ODU2 tunnel, and the network element 105-1 terminates the ODU2 tunnel at ODU2 interface 3/1/2 of network element 105-2. At block 655, the network element creates the Ethernet interface. In some embodiments, the Ethernet interface created by the network element incorporates the same location information as the ODU2 interface associated with the restore path 715.

At block 665, the network element determines whether an Ethernet bundle has been created. If the Ethernet bundle has not been created ("NO"), the network element registers for bundle create notification at block 675. The method 600 returns to block 665. If the Ethernet bundle has been created ("YES"), the method 600 proceeds to block 685, where the network element adds the created Ethernet interface to the Ethernet bundle. Referring to FIG. 7, the network element 105-1 adds the created Ethernet interface (TE link 0/1/2) to the Ethernet bundle 205-1. At block 695, the network element designates the newly-created path as the restore path. Method 600 ends following completion of block 695.

Adding the restore path to the virtual interface provides a "1+R" or a "1+1+R" protection scheme, depending on whether the virtual interface also includes a protect path 710. In some embodiments, the restore path 715 is signaled responsive to determining that the working path 705 or the protect path 710 fails. Once the working path 705 or the protect path 710 is again operational, the restore path 715 may be deleted and removed from the bundle.

Figure 8:
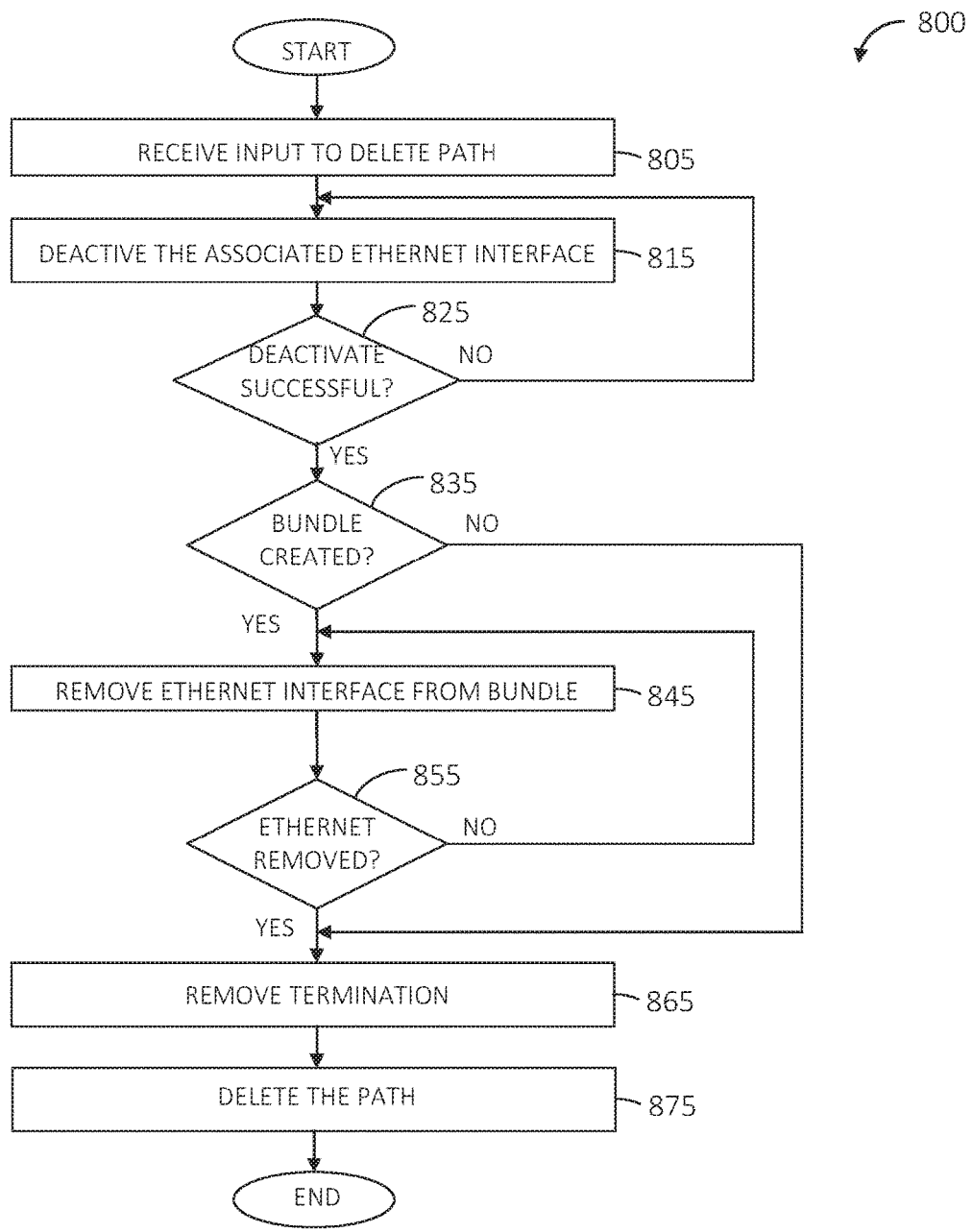
FIG. 8 is an exemplary method for deleting a protect path and/or a restore path within a virtual interface, according to embodiments described herein.

FIG. 8 is an exemplary method 800 for deleting a protect path and/or a restore path within a virtual interface, according to embodiments described herein. Method 800 may be used in conjunction with other embodiments described herein, such as deleting a protect path established using method 300 and/or deleting a restore path established using method 500.

Method 800 begins at block 805, where the network element receives an input to delete a path. At block 815, the network element deactivates the Ethernet interface associated with the path to be deleted. At block 825, the network element determines whether the deactivation was successful. If the deactivation was not successful ("NO"), the method 800 returns to block 815. If the deactivation was successful, the method 800 proceeds to block 835. At block 835, if the network element determines that an Ethernet bundle was created ("YES"), the method 800 proceeds to block 845 and removes the Ethernet interface from the Ethernet bundle. If the removal is not successful at block 855 ("NO"), the method 800 returns to block 845. If the removal is successful ("YES"), or if no Ethernet bundle was created at block 835 ("NO"), the method 800 proceeds to block 865 and the network device removes the termination 865. The network device deletes the path at block 875. Method 800 ends following completion of block 875.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for use by a network element coupled with an optical transport network, the method comprising:
    calculating an optical path from a first packet-terminated optical interface of the network element to a second packet-terminated optical interface of a destination network element coupled with the optical transport network;
    signaling, via a packet-terminated circuit, the optical transport network to create the optical path;
    upon successful creation of the optical path, terminating the packet-terminated circuit;
    creating an Ethernet interface corresponding to the first packet-terminated optical interface;
    adding the Ethernet interface to an Ethernet bundle interface; and
    communicating across the optical path using addressing of the Ethernet bundle interface.

2. The method of claim 1, wherein location information associated with the Ethernet interface is the same as location information associated with the first packet-terminated optical interface.

3. The method of claim 1, wherein the first packet-terminated optical interface comprises an Optical Channel Data Unit-k (ODUk) optical interface.

4. The method of claim 1, wherein the optical path comprises a protect path between the network element and the destination network element, the method further comprising:
    determining that a working path between the network element and the destination network element is operational,
    wherein calculating the optical path from the first packet-terminated optical interface is performed responsive to determining that the working path is operational.

5. The method of claim 1, wherein the optical path comprises a restore path between the network element and the destination network element, the method further comprising:
    determining that a working path or a protect path between the network element and the destination network element is not operational,
    wherein calculating the optical path from the first packet-terminated optical interface is performed responsive to determining that the working path or the protect path is not operational.

6. The method of claim 1, further comprising:
    receiving an input to delete the optical path;
    deactivating the Ethernet interface; and
    removing termination of the optical path.

7. The method of claim 6, further comprising:
responsive to receiving the input to delete the optical path, determining whether the Ethernet interface is included in the Ethernet bundle interface; and
removing the Ethernet interface from the Ethernet bundle interface prior to removing the termination of the optical path.

8. A network element suitable for use with an optical transport network, the network element comprising:
one or more computer processors configured to:
calculate an optical path from a first packet-terminated optical interface of the network element to a second packet-terminated optical interface of a destination network element coupled with the optical transport network;
signal, via a packet-terminated circuit, the optical transport network to create the optical path;
upon successful creation of the optical path, terminate the packet-terminated circuit;
create an Ethernet interface corresponding to the first packet-terminated optical interface;
add the Ethernet interface to an Ethernet bundle interface; and
communicate across the optical path using addressing of the Ethernet bundle interface.

9. The network element of claim 8, wherein location information associated with the Ethernet interface is the same as location information associated with the first packet-terminated optical interface.

10. The network element of claim 8, wherein the first packet-terminated optical interface comprises an Optical Channel Data Unit-k (ODUk) optical interface.

11. The network element of claim 8, wherein the optical path comprises a protect path between the network element and the destination network element, wherein the one or more computer processors are further configured to:
determine that a working path between the network element and the destination network element is operational; and
calculate the optical path from the first packet-terminated optical interface responsive to determining that the working path is operational.

12. The network element of claim 8, wherein the optical path comprises a restore path between the network element and the destination network element, wherein the one or more computer processors are further configured to:
determine that a working path or a protect path between the network element and the destination network element is not operational; and
calculate the optical path from the first packet-terminated optical interface responsive to determining that the working path or the protect path is not operational.

13. The network element of claim 8, wherein the one or more computer processors are further configured to:
receive an input to delete the optical path;
deactivate the Ethernet interface; and
remove termination of the optical path.

14. The network element of claim 13, wherein the one or more computer processors are further configured to:
responsive to receiving the input to delete the optical path, determine whether the Ethernet interface is included in the Ethernet bundle interface; and
remove the Ethernet interface from the Ethernet bundle interface prior to removing the termination of the optical path.

15. A computer program product for use by a network element coupled with an optical transport network, the computer program product comprising:
a non-transitory computer-readable storage medium having computer-readable program code embodied therewith, the computer-readable program code executable by one or more computer processors to perform an operation that includes:
calculating an optical path from a first packet-terminated optical interface of the network element to a second packet-terminated optical interface of a destination network element coupled with the optical transport network;
signaling, via a packet-terminated circuit, the optical transport network to create the optical path;
upon successful creation of the optical path, terminating the packet-terminated circuit;
creating an Ethernet interface corresponding to the first packet-terminated optical interface;
adding the Ethernet interface to an Ethernet bundle interface; and
communicating across the optical path using addressing of the Ethernet bundle interface.

16. The computer program product of claim 15, wherein location information associated with the Ethernet interface is the same as location information associated with the first packet-terminated optical interface.

17. The computer program product of claim 15, wherein the first packet-terminated optical interface comprises an Optical Channel Data Unit-k (ODUk) optical interface.

18. The computer program product of claim 15, wherein the optical path comprises a protect path between the network element and the destination network element, the operation further including:
determining that a working path between the network element and the destination network element is operational,
wherein calculating the optical path from the first packet-terminated optical interface is performed responsive to determining that the working path is operational.

19. The computer program product of claim 15, wherein the optical path comprises a restore path between the network element and the destination network element, the operation further including:
determining that a working path or a protect path between the network element and the destination network element is not operational,
wherein calculating the optical path from the first packet-terminated optical interface is performed responsive to determining that the working path or the protect path is not operational.

20. The computer program product of claim 15, the operation further including:
receiving an input to delete the optical path;
deactivating the Ethernet interface; and
removing termination of the optical path.

* * * * *

UNITED STATES PATENT AND TRADEMARK OFFICE
CERTIFICATE OF CORRECTION

PATENT NO. : 10,320,476 B2  
APPLICATION NO. : 15/796548  
DATED : June 11, 2019  
INVENTOR(S) : Akshaya Nadahalli et al.

Page 1 of 1

It is certified that error appears in the above-identified patent and that said Letters Patent is hereby corrected as shown below:

In the Specification

In Columns 5-6, Line 42, delete "B2.132.62.62" and insert -- B2.B2.B2.B2 --, therefor.

In Column 9, Line 5, delete "B2.132.132.132" and insert -- B2.B2.B2.B2 --, therefor.

Signed and Sealed this  
Third Day of September, 2019

Andrei Iancu  
*Director of the United States Patent and Trademark Office*